Patented Nov. 20, 1934

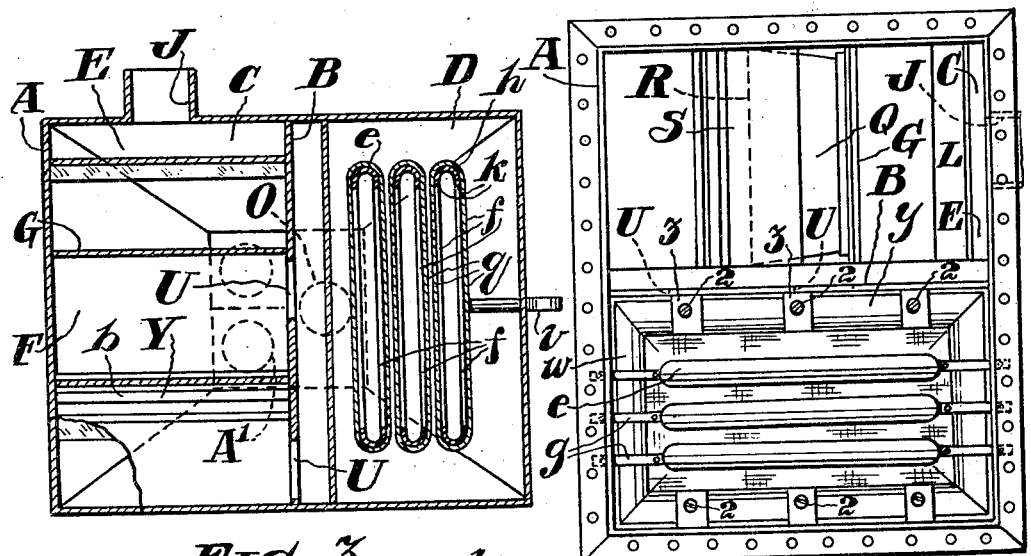
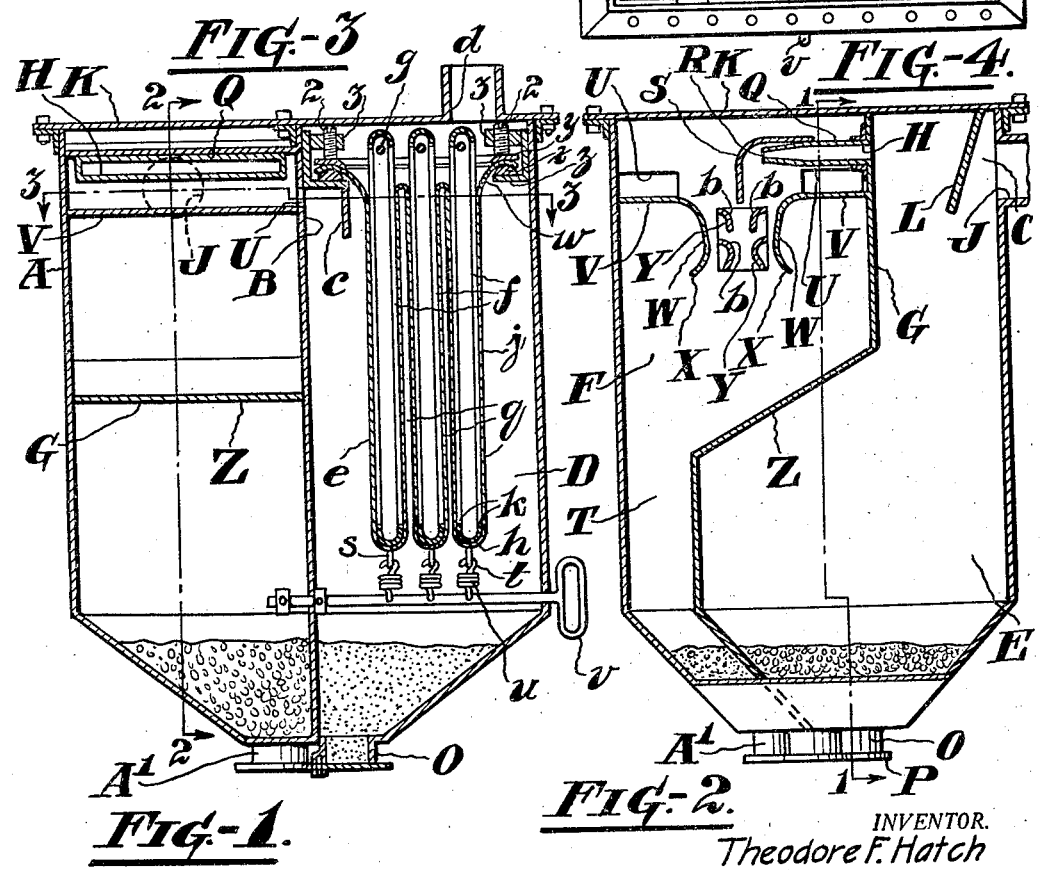

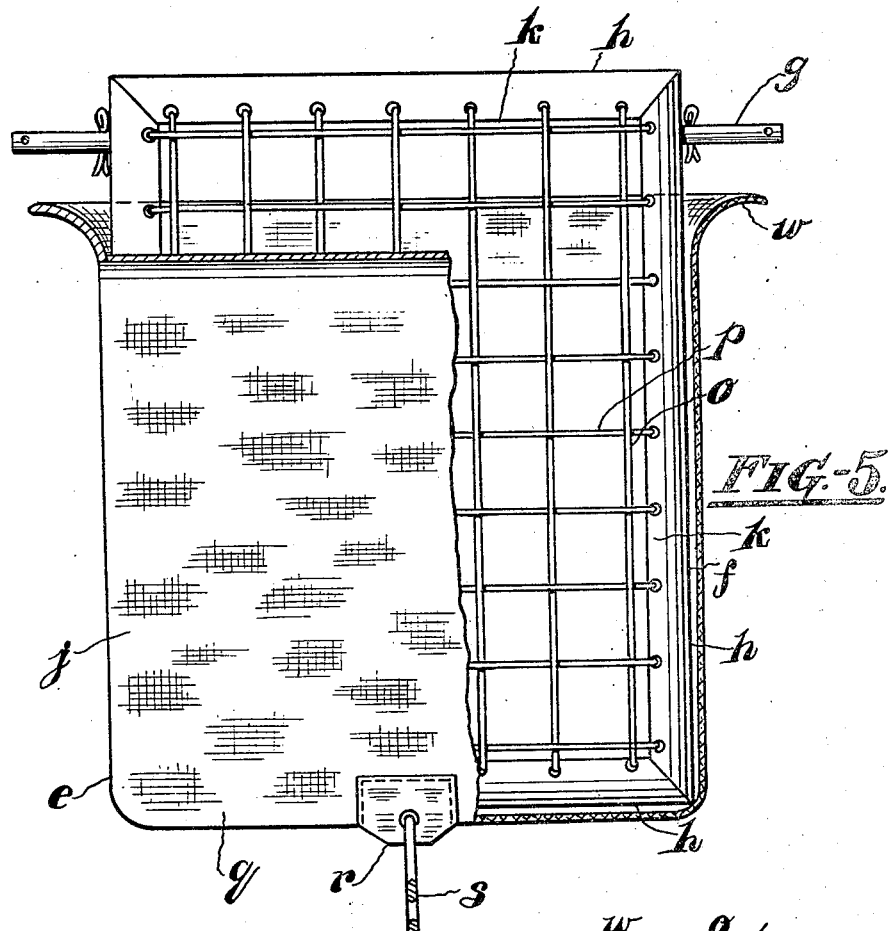
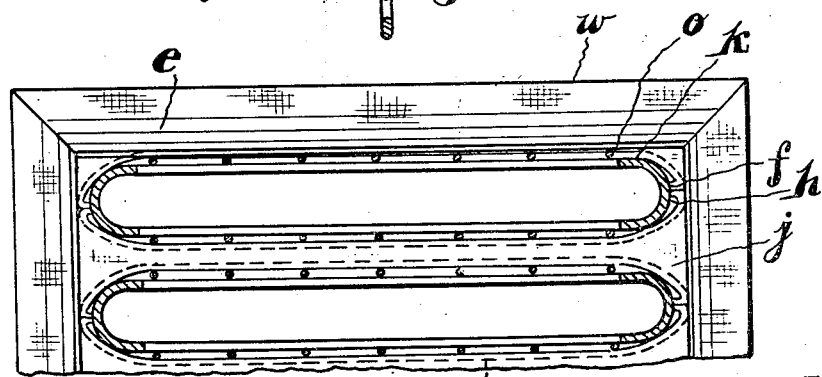

1,981,356

UNITED STATES PATENT OFFICE 1,981,356

DUST REMOVAL DEVICE

Theodore F. Hatch, Cambridge, Mass., assignor, by mesne assignments, to Kadco Corporation, New York, N. Y., a corporation of New York Application June 16, 1933, Serial No. 676,036

5 Claims. (Cl. 183—34)

This invention relates to separators, and more particularly to a dust removal device adapted to remove and filter dust from air whereby it is entrained.

A specific use of the device may be that of removing rock dust from the air used for conveying cuttings from a drill hole.

One object of the invention is to effect a substantial separation of the air and abrasive substances entrained thereby prior to the passage of the air through the final filtering element thereby relieving the load on the latter.

Another object is to provide a unitary separator and filtering device which is compact and readily portable so that it may at all times occupy a position closely adjacent the source of dust and thereby eliminate the necessity of exposing the conduits, whereby the dust is conveyed, to the abrading action of the dust.

Other objects will be in part obvious and in part pointed out hereinafter.

In the accompanying drawings forming a part of this specification and in which similar reference characters refer to similar parts, Figure 1 is a sectional elevation of the dust removal device taken through Figure 2 on the line 1—1 looking in the direction indicated by the arrows and showing the final stage separator compartment and the filtering section, Figure 2 is a sectional elevation taken through Figure 1 on the line 2—2 looking in the direction indicated by the arrows, Figure 3 is a plan view in section taken through Figure 1 on the line 3—3 looking in the direction indicated by the arrows, Figure 4 is a top plan view of the dust removal device, showing the top wall or cover removed, Figure 5 is a side elevation, partly broken away, of the filtering element, and Figure 6 is a plan view, partly in section.

Referring more particularly to the drawings, the dust removal device, constructed in accordance with the practice of the invention, comprises a casing A shown as being of rectangular shape and having an internal wall B to separate the interior of the casing into separator and filtering sections C and D, respectively.

In the form of the invention shown, the section C is separated into two compartments E and F by a wall G having an opening H to afford communication between the compartments. The compartment E constitutes the initial stage compartment into which air and dust are drawn from a source, as for instance a drill hole, through an inlet opening J in the side of the casing A. Within the compartment E, and depending from the cover K of the casing A, is an inclined baffle L which extends across the inlet opening J to deflect the stream downwardly before flowing to the opening H and thus cause projection of the dust toward the bottom of the compartment E, whence it may be removed through a gate O normally sealed by a cover P.

The openings H and J are located near the top of the casing A on opposite sides of the baffle L so that the course of the air stream is reversed sharply in the compartment E by the baffle L. As a preferred form of construction the opening H is of small height as compared with its width, so that the air, and the dust remaining therein, will pass from the separator compartment E in the form of a flat elongated stream.

Disposed within the compartment F, to form a continuation of the opening H, is a nozzle Q having a restricted discharge opening R to cause the air and dust to flow into the compartment F in the form of a high velocity jet which impacts against a baffle S arranged in front of the nozzle to deflect the air stream downwardly toward the bottom of the compartment F. A considerable portion of the dust remaining in the air stream after its passage through the initial separator stage will, owing to its high kinetic energy, be thus projected into the inactive zone T of the compartment F, whence it may be removed through a gate A' at the bottom of the casing A.

After being deflected downwardly by the baffle S the air flows in a generally upwardly direction and passes from the compartment F into the filtering section D through discharge openings U in the wall B, said discharge openings U being arranged on opposite sides of the baffle S.

Between the upper portion of the compartment F and the inactive or dust storage portion T are a pair of guide plates V which may lie in substantially the same transverse plane as the lowermost end of the baffle S and have depending portions W which are suitably spaced with respect to each other to provide an areaway between the upper and lower portions of the compartment F. The lowermost ends X of the depending portions W are preferably curved outwardly so that any air circulating in the top portion of the inactive zone of the compartment F will, upon eddying around the curved portions X, carry the particles of dust entrained in the air into intimate contact with the under surfaces of the plates V to which a considerable portion of such dust will adhere.

In order to provide a clearly defined pathway for the dust particles flowing into the storage space of the compartment F, a series of plates Y are arranged in pairs at different elevations below the baffle S. The plates Y of a pair lie on opposite sides of the vertical plane wherein the depending portion of the baffle S is located so that the dust deflected by the baffle S is caused to flow downwardly between the baffles Y against an inclined portion Z of the wall G along which it may slide, upon accumulation, to the bottom of the compartment.

To the end that any air flowing counter to the stream of dust flowing downwardly between the baffle plates Y may be subjected to a further scrubbing action, the baffle plates Y are each provided at their upper ends with outwardly curved portions b extending generally in the direction of the adjacent portions W of the plates V. Owing to this arrangement the air flowing upwardly along the depending portions W of the plates V will be caused to swirl so that the dust particles will be centrifugally cast against the portions W to which they may adhere until, owing to their collective weight, they will drop into the storage space of the compartment F. The air will then continue, along with the main air stream, through the discharge openings U into the filter section D where it is deflected downwardly by a baffle c supported by the wall B and overlying the openings U.

As may be readily appreciated, during its course through the separator compartments the air stream is freed of substantially all such dust particles as may be practically removed therefrom by centrifugal action. There remains in the air however, a residue of finely comminuted dust which, depending upon the nature of the rock being drilled, may be decidedly harmful when inhaled and is, in any event, objectionable when discharged into the atmosphere. It is accordingly contemplated to pass the air through a filtering device before discharging it from the casing which, in the present instance, takes place through a main outlet opening d in the cover K and to which the pumping apparatus (not shown) may be connected. To this end a filtering element, designated in general by e, is disposed in the filtering section D in such wise that all the air drawn into the filtering section passes through the filtering element during its course to the outlet opening d.

The filtering element may be of any suitable and well known type. That illustrated comprises a series of frames f depending from rods g arranged in the uppermost portion of the section D and upon which the frames f are pivoted. The frames f may, as shown, be of rectangular shape and the main or outer portions h are preferably U-shaped in cross section, thus providing a rounded surface for engagement with the filtering fabric j.

On the opposite sides of the frames f and suitably secured to the legs k of the portions h of the filtering frames are bars or wires designated, according to groups, as o and p which may be arranged in mutually perpendicular fashion between the opposed sections or portions h of the filtering frames. The wires of a group are suitably spaced with respect to each other to assure a minimum of resistance to the air flowing through the filtering fabric j while at the same time preventing the portions of the filtering fabric lying on opposite sides of the frame from collapsing or being drawn together.

The filtering fabric may, as is customary, consist of a single piece formed into a series of pockets q. At the lower ends of the pockets q are grommets r carrying links s for engagement with hooks t of springs u mounted upon a shaker rod v. The shaker rod v, which lies beneath the filtering frames, is slidable in the walls of the casing for shaking the pockets q to remove accumulated dust therefrom.

Near the upper end of the bags q is an outwardly flared portion or skirt w having its outer edges clamped between a pair of sealing rings x and y which are pressed against a flange z in the filter section D by screws 2 threaded into a flange 3.

The operation of the device, briefly described, is as follows: After passing through the opening J into the compartment E the air and dust are deflected downwardly by the baffle L and, upon curling around the end of the baffle, the heavier dust particles are hurled from the air stream to the bottom of the compartment. The air and entrained dust then pass through the restricted portion R of the nozzle at highly accelerated velocity so that, upon impacting against the plate S whereby the air stream is deflected downwardly, the dust particles are cast through the areaway between the baffle plates Y against the inclined portions Z of the wall G.

Obviously a portion of the air will be caused to flow between the baffles Y and, in practice, it has been found that some air also circulates around the vicinity of the lowermost baffles Y. These air currents circulating in the compartment F intercept dust particles which would ordinarily be again returned to the main air stream to be carried thereby to the filtering section D. In the arrangement shown, however, the air and dust issuing from the inactive zone of the compartment F return to the main air stream through the spaces existing between the portions W of the plates V and the baffle plates Y.

During its upward course the air is caused to follow a swirling motion by the curved portions b of the baffle plates Y so that a considerable portion of the dust contained in the air is centrifugally cast therefrom or is brought into intimate contact with the surfaces of the plates W and the baffle plates Y to which it adheres. The air then continues its upward motion and passes from the final separation compartment with the main air stream.

Upon entering the filtering section D the air is deflected downwardly by the baffle c, then passes through the filtering fabric at a low velocity to effect removal of the remaining dust particles. After passing through the filtering fabric the strained air passes through the outlet opening d and may again be discharged into the atmosphere in a hygienically safe condition.

I claim:

1. A dust removal device comprising a casing having a separator compartment through which dust laden air flows, said compartment having inlet and outlet openings, a nozzle forming a continuation of the inlet opening and having a restricted portion to accelerate the velocity of the air flowing into the compartment, a baffle to deflect the air stream issuing from the nozzle for casting dust from the air stream, and curved plates in the compartment arranged at different elevations to cause a swirling motion of the air flowing to the outlet opening for centrifugally projecting dust from the air.

2. A dust removal device comprising a casing having a separator compartment and inlet and outlet openings for air, means between the openings for deflecting the air stream to dynamically project dust from the air stream into an inactive portion of the compartment, means to define an areaway between the deflecting means and such inactive portion of the compartment, and curved baffles in the areaway to induce a swirling motion of the air returning from the inactive portion of the compartments and thereby cause a further centrifugal projection of dust from the air.

3. A dust removal device comprising a casing having a series of communicating separator compartments into which dust laden air flows at progressively increasing velocities, means in the compartments for deflecting the air stream, thereby causing dust to be cast dynamically from the air stream, means defining an areaway in the final stage compartment to conduct air and dust in one direction, and a series of baffles in the areaway having curved portions to induce a swirling motion of air flowing in a counter direction and a consequent centrifugal projection of dust therefrom prior to the passage of the air from the final stage compartment.

4. A dust removal device comprising a casing having a series of communicating separator compartments into which dust laden air flows at progressively increasing velocities, means in the compartments for deflecting the air stream, thereby causing dust to be cast dynamically from the air stream, a series of baffles arranged in pairs at different elevations to define a pathway for the air and dust entering the final stage compartment and having curved portions to induce a swirling motion of air flowing in a counter direction to the incoming air and a consequent centrifugal projection of dust therefrom prior to the passage of the air from the final stage compartment, a filtering compartment in the casing, and a filtering element in the filtering compartment for straining the air issuing from the final separator compartment.

5. A dust removal device comprising a casing having separator and filtering sections, a wall separating the separator section into initial and final stage separator compartments and having an opening through which dust laden air flows from the initial stage compartment to the final stage compartment, a nozzle forming a continuation of the opening and having a restricted portion to accelerate the velocity of the air and dust flowing therethrough, means for deflecting the air entering the compartments to effect centrifugal projection of dust to the bottoms of the compartments, means in the final stage compartment to cause a swirling motion of the air for further projecting dust from the air, an outlet opening of greater area than the restricted portion of the nozzle to conduct air and dust from the final stage separator compartment into the filtering section at comparatively low velocity, and a filtering element in the filtering section to strain the residue of dust from the air.

THEODORE F. HATCH.